United States Patent [19]

Murray et al.

[11] Patent Number: 4,818,780

[45] Date of Patent: Apr. 4, 1989

[54] RADIATION-CURABLE PHENOXY RESINS, PRODUCTION THEREOF, AND ELECTRON BEAM-CURABLE COMPOSITIONS CONTAINING THE SAME

[75] Inventors: Kevin P. Murray, Hoffman Estates; William E. Hoffman, Roselle; Robert E. Ansel, Hoffman Estates, all of Ill.

[73] Assignee: DeSoto, Inc., Des Plaines, Ill.

[21] Appl. No.: 185,538

[22] Filed: Apr. 25, 1988

[51] Int. Cl.$^4$ ................................................ C08G 18/04
[52] U.S. Cl. .................................... 524/430; 524/431; 524/779; 524/785; 525/523; 528/69
[58] Field of Search ............... 524/430, 431, 779, 785; 525/523; 528/69

[56] References Cited

U.S. PATENT DOCUMENTS 4,246,391 1/1981 Watson ............................. 525/523

Primary Examiner—Maurice J. Welsh
Attorney, Agent, or Firm—Dressler, Goldsmith, Shore, Sutker & Milnamow, Ltd.

[57] ABSTRACT

The reaction product of an adduct of an ethylenically unsaturated monohydric alcohol, such as 2-hydroxyethyl acrylate, with an organic diisocyanate in which one of the two isocyanate groups is more strongly reactive than the other, such as isophorone diisocyanate, is reacted with a phenoxy resin in solvent solution. The alcohol is used in a molar excess of at least about 3% up to 30% to insure the absence of any significant proportion of unreacted diisocyanate. The phenoxy resin which is reacted with is a high molecular weight hydroxy functional polyether having a number average molecular weight above 10,000 and an hydroxy functionality in the range of from about 20 to about 300. The adduct is used in an amount to introduce about 1.5 to about 20 ethylenically unsaturated groups per molecule of the polyether, and the reaction is continued to substantially eliminate unreacted isocyanate functionality. These unsaturated products are useful in electron beam coating compositions, especially in combination with unsaturated liquids which lower the glass transition temperature. They can also be used in combination with acrylate-terminated polyurethanes to provide films having greater handleability prior to cure.

26 Claims, No Drawings

RADIATION-CURABLE PHENOXY RESINS, PRODUCTION THEREOF, AND ELECTRON BEAM-CURABLE COMPOSITIONS CONTAINING THE SAME

TECHNICAL FIELD

This invention relates to radiation-curable phenoxy resins, the production of such resins, and to electron beam-curable compositions containing these resins which are especially useful for magnetic media.

BACKGROUND ART

Magnetic media normally comprise a layer of synthetic resin pigmented with a magnetizable pigment which is carried by a non-magnetic support, typically a layer of ethylene glycol terephthalate polyester, such as is available in commerce under the trade designation Mylar. Because of the speed of production and the achievement of favorable properties, it has been desired to employ radiation-curable compositions, the radiation of preference being electron beam. It is desired to provide electron beam-curable polymers which are hard and tough, especially to blend with the generally softer radiation-curable ethylenically unsaturated polyurethanes which are now available.

At the present time, these generally softer radiation-curable ethylenically unsaturated polyurethanes are blended with polyethylenically unsaturated crosslinking monomers, illustrated by trimethylol propane triacrylate, in order to increase the hardness of the cured composition. Unfortunately, the increased hardness conferred by the polyethylenic crosslinking monomer is obtained at the sacrifice of desired toughness and attendant elongation. It is therefore necessary to develop ethylenically unsaturated polymers which will provide the needed hardness and toughness and to find ways to practically produce such polymers.

DISCLOSURE OF INVENTION

In accordance with this invention, we adduct an ethylenically unsaturated monohydric alcohol with an organic diisocyanate in which one of the two isocyanate groups is more strongly reactive than the other, the alcohol being used in a molar excess of at least about 3%. This is to insure the absence of any significant proportion of unreacted diisocyanate because very little diisocyanate is enough to gel the final product contemplated herein.

A greater amount of excess unsaturated alcohol may be present, up to around 30%. In preferred practice, excess unsaturated alcohol is used in an amount of 5% to 20%, and most preferably in an amount of 5% to 10%.

The monoethylenically unsaturated monoisocyanate and unreacted ethylenically unsaturated monohydric alcohol are reacted until the reaction product is substantially free of any significant proportion of unreacted diisocyanate, preferably little more than a trace thereof. To insure this, in preferred practice the reaction with excess alcohol is continued until substantially all of the excess alcohol has reacted. This is conveniently assured by following the residual NCO content by titration or infra red spectroscopy.

It is possible that some of this unreacted monohydric alcohol will react with the less reactive isocyanate group of the organic diisocyanate even though reaction conditions are used to strongly favor the reaction of one of the isocyanate groups and not the other, but this can be tolerated. The point of importance in this invention is that diisocyanate must be substantially completely eliminated. Unreacted monoethylenically unsaturated alcohol and diethylenically unsaturated diurethane are not harmful if present in relatively small amounts. The specified maximum proportion of unsaturated alcohol prevents the presence of excessive proportions of these components.

The monoethylenically unsaturated monoisocyanate reaction product specified above is reacted with a phenoxy resin. Phenoxy resins are high molecular weight hydroxy functional polyethers, generally having a number average molecular weight above 10,000 preferably in the range of 20,000 to 60,000. These are essentially epoxy resins which have been reacted with additional bisphenolic material so as to possess such high molecular weight that their epoxy functionality is no longer significant. Indeed, when the bisphenol reactant is used in excess, which is permissible, there is no residual epoxy functionality. Since every bisphenol group which is added to the chain produces an hydroxy group, the hydroxy functionality of the phenoxy resins will range from about 20 to about 300, and is typically about 100.

The phenoxy resins under consideration are usually made from bisphenol A, any bisphenol having the formula presented below may be used:

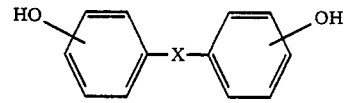

in which X denotes a divalent group which may be -O-, -S- or an alkylene group. When X is propylene with the two valences on the central carbon atom, and when the two phenolic OH groups are in the para position, the bisphenol is known as bisphenol A.

Organic diisocyanates in which one of the two isocyanate groups is more strongly reactive than the other are well known. These are illustrated by isophorone diisocyanate and toluene diisocyanate. Thus, the selection of an appropriate diisocyanate is itself conventional.

Ethylenically unsaturated monohydric alcohols which may be used are illustrated by hydroxyalkyl acrylates and methacrylates, such as 2-hydroxyethyl acrylate and 2-hydroxyethyl methacrylate. The corresponding hydroxypropyl and hydroxybutyl acrylates and methacrylates are also fully useful. Even allyl or methallyl alcohol are useful, though less desirable because of their slower cure rate.

The monoethylenically unsaturated monoisocyanate products which have been described above are reacted with the phenoxy resin in a proportion to introduce about 1.5 to about 20, preferably from 2-10 ethylenically unsaturated groups per molecule of the phenoxy resin.

The reaction with the monoisocyanate is a well known reaction which proceeds easily at moderate temperatures of from about 20° C. to about 75° C., this reaction being aided with a catalyst of known character, most usually dibutyl tin dilaurate. In the reaction with the first (more reactive) isocyanate group on the diisocyanate, the lower reaction temperatures below about 30° C. are preferred to substantially prevent reaction of the second (less reactive) isocyanate group. In this way almost all of the more reactive isocyanate groups are consumed in the reaction, and the number of less reactive isocyanate groups which are consumed becomes of little interest.

The reaction with the phenoxy resin is carried out in solution in a relatively strong organic solvent capable of dissolving the phenoxy resin, such as tetrahydrofuran or methyl ethyl ketone. The unsaturated monoisocyanate is slowly added to the solution of phenoxy resin at about room temperature and then the reaction mixture is held at room temperature for about one hour. Then the temperature is increased to 50°–60° C. and maintained at this higher temperature for 2 to 3 hours to consume all the isocyanate functionality present. Residual isocyanate can be followed to insure its consumption, as previously indicated.

It is preferred to use enough of the unsaturated monoisocyanate to introduce at least 2.0 up to about 10, most preferably to provide a functionality of from 3–5.

It is stressed that the presence of the described excess of unsaturated monohydric alcohol is essential, for otherwise we cannot incorporate the desired proportion of monoethylenic monoisocyanate into the phenoxy resin. This is because even a small amount of unreacted isocyanate functionality, as would be inevitably present if one reacted equimolar proportions of isophorone diisocyanate with 2-hydroxyethyl methacrylate, and then reacted the product with a typical phenoxy resin using enough of the reaction product to provide even 1.0 acrylate groups per molecule of phenoxy resin, would cause gelation. A gelled product is useless for the production of an electron-beam curable composition or for use in any process in which the composition is to applied to a substrate or handled in any desired fashion as a liquid.

It is desired to point out that when the polyethylenically unsaturated phenoxy resins of this invention are cured by radiation exposure, they have a very high glass transition temperature ($T_g$) in excess of about 80° C. For many purposes it is desired to have softer cured products, so it is usual to add low $T_g$ additives, which may be monoethylenic, such as phenoxyethyl acrylate or ethoxyethoxy ethyl acrylate, or polyethylenic, such as acrylate-capped polyurethanes based on polyethers or polyesters.

As a matter of interest, the usual acrylated polyurethanes have relatively low $T_g$ (30° to 50°) prior to cure. Also, liquid polyacrylates are plasticizers prior to cure and thus lower the $T_g$ of the oligomer being modified. Lower $T_g$ denotes lower strength. In this invention, the unsaturated phenoxy resins posses higher $T_g$ prior to cure. This is unusual and it enables the provision of uncured films which can be more effectively handled. This is illustrated by the production of magnetic media where it is frequently desired to calender the film prior to electron beam curing, and this requires that the film prior to such cure have reasonably good properties. This greater capacity to handle the films of this invention prior to curing applies to those in which the phenoxy resins are used alone as well as to those in which the phenoxy resins are blended together with the acrylated polyurethanes previously used.

The unsaturated phenoxy polyurethanes of this invention preferably constitute from 20% to 80% of the admixture with the low $T_g$ additives, the balance being one or more of the additives described in the previous paragraph.

The additives are frequently of liquid character, but these are rarely capable of providing sufficient liquidity when they are the only liquid compoenents present. Accordingly, the unsaturated phenoxy polyurethanes of this invention normally require the presence of volatile inert organic solvent to provide useful liquid products. The curable liquid products of this invention are normally provided in organic solvent solution containing at least about 10% by weight of solvent, more usually at least about 25%, based on the total weight of reactive material and solvent, and this solvent is allowed to remain and be present in the final coating composition. Accordingly, the coating composition will contain at least about 10%, preferably at least about 25% of volatile inert organic solvent, ignoring the pigment which is usually also present.

While highly polar solvents having great solvating power are normally needed and used herein, other solvents, like acetone, butyl acetate or isopropanol may be present, usually in small proportion. In the pigmented systems of prime concern herein, the pigment will be present in a pigment to binder weight ratio of at least 0.5:1, preferably in excess of 1:1, and the solvent is present in an amount to reduce the total solids content of the pigmented coating to the range of from 25% to 60%. The presence of the pigment normally prevents cure with ultraviolet light, hence the preference for electron beam curing. The presence of a large proportion of magnetizable particles is essential to enable the production of magnetic media.

Magnetic oxide particles are particularly desired since these allow the provision of magnetic recording structures, especially when used in a pigment to binder weight ratio of at least 2:1. The pigments are uniformly ground into the resin solution, and pigment wetting aids may be present, as disclosed in the application of R.E. Ansel and K. P. Murray U.S. Ser. No. 938,453 filed Dec. 5, 1986, now U.S. Pat. No. 4,749,146.

The terms "acrylate" and "methacrylate", as used herein, denote a plurality of acrylic acid or methacrylic acid ester groups, and this is one accepted use of these terms.

This invention is illustrated in the examples which follow, it being understood that throughout this application, all parts and proportions are by weight, unless otherwise specified. All molecular weights are by calculation, and are hence number average molecular weights.

EXAMPLE 1

To a clean, 1 liter flask, equipped with a dry air sparge, agitator, external drying tube and addition funnel, are charged 417 g of isophorone diisocyanate along with 2.6 g of phenothiazine and 1.3 g of dibutyltin dilaurate catalyst. 240 g of 2-hydroxyethyl acrylate are charged to the addition funnel and slowly added to the flask, under agitation, over a period of 6 hours. All the reactants start at room termperature, and cooling is used to maintain the flask temperature below 20° C. The product is measured for isocyanate content by titration and held until the level drops to 10.8±0.5% by weight.

EXAMPLE 2

To a clean 1 liter flask, equipped as above, are charged 288.5 g of 2,4-toluene diisocyanate and 2.1 g of phenothiazine. To the addition funnel are charged 211.5 g of 2-hydroxyethyl acrylate, and slowly added to the flask under agitation over an 8 hour period. Again the temperature is maintained below 20° C. The product is measured for isocyanate content by titration and is held until the level drops to 12.5±0.5 by weight.

EXAMPLE 3

To a clean 1 liter flask, equipped as above, are charged 274.3 g of 2,4-toluene diisocyanate and 2.1 g of phenothiazine. 225.7 g of 2-hydroxyethyl methacrylate are charged to the addition funnel and slowly added to the flask under agitation over a 6 hour period, this time maintaining the flask temperature under 25° C. The isocyanate content at the end point is 12.0±0.5% by weight.

POLYMER PREPARATION

The phenoxy resins used in these syntheses are commercial products resulting from multiple epoxyphenolic OH reactions with bisphenol-A to a number average molecular weight of approximately 30,000. This results in a hydroxyl functionality of approximately 100. These can be adducted with any of the (meth)acrylate monoisocyanates formed in Examples 1-3 to form a polyurethane containing a plurality of acrylate or methacrylate groups.

EXAMPLE 4

To 800 g of a (approx. 30000 g/mol M.W.) phenoxy resin solution in methyl ethyl ketone (NVM=35%) are added 10.0 g of the adduct of Example 1. The solution is agitated at 25° C. until the isocyanate content is below 0.1% by weight. This resin has the following cured (10 Mrads) mechanical properties: Tensile=7000 psi, elongation=5%, and modulus (at 2.5% strain)=220,000 psi. The $T_g$ of the cured film as determined by DSC is 87° C.

EXAMPLE 5

To 200 g of the phenoxy resin solution used in Example 4 are added 16 g of the adduct of Example 1. The solution is agitated at 40° C. until the isocyanate level is below 0.1% by weight. This resin has the following cured (10 Mrads) mechanical properties: Tensile=7500 psi, elongation=4%, modulus (at 2.5% strain)=240,000 psi. The $T_g$ of the cured film as determined by DSC is 83° C.

EXAMPLE 6

To 202 g of the phenoxy resin solution used in Example 4 are added 3.0 g of the product in Example 2, with stirring to an isocyanate end point of 0.1% by weight. This product has cured (10 Mrads) mechanical properties: Tensile=8000 psi, 4% elongation, and modulus (at 2.5% strain)=260,000 psi. The $T_g$ of the cured film as determined by DSC is 80° C.

The importance of using a molar excess of hydroxy (meth)acrylate with respect to isocyanate is to minimize the concentration of free diisocyanate in the statistical distribution of products. Use of close to 1:1 molar ratios in reproducing Examples 1-3 leads to excessive free diisocyanate concentration. When the adducts so-prepared are introduced to the phenoxy resin in Examples 4-6 instead of those described, covalently crosslinked gels are formed, which is useless since these gels cannot be dissolved for application as liquid coatings.

EXAMPLE 7

Examples 4-6 are repeated with the addition of 30% of phenoxyethyl acrylate. Electron beam curing as in Examples 4-6 produces cured coatings which are more extensible, albeit of lesser strength.

EXAMPLE 8

Example 4-7 are repeated after grinding in sufficient magnetizable iron oxide to provide a pigment to binder weight ratio of 3.5:1. These compositions are coated on Mylar and cured with electron beam, as in Examples 4-7, to provide useful magnetic media structures.

The products of this invention are particularly useful when blended with other ethylenically unsaturated oligomers, especially acrylate-terminated polyurethanes.

Reference is made to the commonly owned U.S. Pat. No. 4,607,068 issued Aug. 19, 1986 in which the polyurethane of Example 2 of that patent is typically blended with tris(2-hydroxyethyl) isocyanurate triacrylate in weight proportions (solids basis) of 60:40. While this combination possesses good properties after cure, when the solvent has evaporated to provide an uncured film, that uncured film has a $T_g$ below 0° C. and is soft at room temperature. As a result, the uncured film is fragile and cannot be handled at room temperature.

In contrast, when the products of this invention are used in combination with acrylate-functional liquids, preferably in a weight ratio (based on solids) of 80:20 to 40:60, the uncured films which are formed after evaporation of volatile solvent have a $T_g$ above room temperature and are handleable. Indeed, the $T_g$ is usually above 30° C. and the films have moderate strength prior to cure so that they can be calendered.

While an acrylate-terminated polyurethane can be used with the acrylate-functional phenoxy resins provided by this invention, it is preferred to employ the type of acrylate-terminated polyurethane described in Pat. No. 4,607,068 and to employ any of the reactive ethylenically unsaturated liquids known for inclusion in such compositions. These are further illustrated by trimethylol propane triacrylate or hexane diol diacrylate. The high $T_g$ acrylated products of this invention are compatible with acrylated polyurethanes generally and function to increase the strength and handleability of the uncured films which are produced after evaporation of organic solvent.

To illustrate this concept, the previously discussed mixture containing 60 parts of the solid acrylate-terminated polyurethane produced in Example 2 of said patent 4,607,068 can be replaced with 60 parts of a mixture of that polyurethane with the acrylate-functional phenoxy resins of this invention, this mixture having a weight ratio based on solids of 80:20 to 40:60, preferably 75:25 to 50:50. The combination of 60 parts of an illustrative mixture of weight ratio 60:40 with 40 parts of tris(2-hydroxyethyl) isocyanurate triacrylate provides a film (after removal of organic solvent) having much a higher $T_g$ than that containing only the acrylate-terminated polyurethane. This higher $T_g$ film has enough toughness and integrity to allow it to be calendered. After cure, the compositions of this invention have the same or better hardness and toughness as those of the patent previously discussed.

What is claimed is:

1. The reaction product of an adduct of an ethylenically unsaturated monohydric alcohol with an organic diisocyanate in which one of the two isocyanate groups is more strongly reactive than the other, the alcohol being used in a molar excess of at least about 3% up to 30% to insure the absence of any significant proportion of unreacted diisocyanate, with a high molecular weight hydroxy functional polyether having a number average molecular weight above 10,000 and an hydroxy functionality in the range of from about 20 to about 300, said adduct being used in an amount to introduce about 1.5 to about 20 ethylenically unsaturated groups per molecule of said polyether, and the reaction being continued to substantially eliminate unreacted isocyanate functionality.

2. The reaction product recited in claim 1 in which said polyether has a number average molecular weight in the range of 20,000 to 60,000.

3. The reaction product recited in claim 1 in which said adduct is used in an amount to introduce 2–10 ethylenically unsaturated groups per molecule of said polyether.

4. The reaction product recited in claim 1 in which said adduct is produced under reaction conditions adequate for the reaction of the said more reactive isocyanate group while minimizing reaction of the other less reactive isocyanate group.

5. The reaction product recited in claim 1 in which said adduct is produced using said alcohol in a molar excess of from 5% to 20% and the reaction to produce said adduct is continued until substantially all of the excess alcohol has reacted.

6. The reaction product recited in claim 1 in which said adduct is produced by reaction in organic solvent solution.

7. The reaction product recited in claim 6 in which said adduct is produced using said alcohol in a molar excess of from 5% to 10%.

8. The reaction product recited in claim 1 in which said adduct is produced by reaction at a temperature below 30° C. in the presence of a catalyst for the reaction between the hydroxy group and the isocyanate group.

9. The reaction product recited in claim 1 in which said adduct is produced using said alcohol in a molar excess of from 5% to 20%, and said adduct is used in an amount to introduce 3–5 ethylenically unsaturated groups per molecule of said polyether.

10. The reaction product recited in claim 1 in which said alcohol is 2-hydroxyethyl acrylate.

11. The reaction product recited in claim 9 in which said adduct is produced using said alcohol in a molar excess of from 5% to 20%, said adduct is used in an amount to introduce 3–5 ethylenically unsaturated groups per molecule of said polyether, and said polyether has a number average molecular weight in the range of 20,000 to 60,000.

12. The reaction product recited in claim 11 in which said polyether resin is the reaction product of a polyepoxide with a bisphenol.

13. The reaction product recited in claim 12 in which said bisphenol is bisphenol A.

14. An electron beam-curable coating composition, comprising the reaction product of claim 1 in combination with unsaturated liquids which lower the glass transition temperature.

15. An electron beam-curable coating composition as recited in claim 14 in which inert volatile organic solvent is present to provide coating viscosity.

16. An electron beam-curable coating composition as recited in claim 14 in which the unsaturated liquids which lower the glass transition temperature comprise a monoethylenically unsaturated liquid.

17. An electron beam-curable coating composition as recited in claim 16 in which said monoethylenically unsaturated liquid comprises phenoxyethyl acrylate or ethoxyethoxy ethyl acrylate.

18. An electron beam-curable coating composition as recited in claim 14 in which the unsaturated liquids which lower the glass transition temperature comprise a polyethylenic acrylate-capped polyurethane.

19. An electron beam-curable coating composition as recited in claim 15 in which the reaction product of claim 1 constitutes from 20% to 80% of the admixture with unsaturated liquids which lower the glass transition temperature.

20. An electron beam-curable coating composition as recited in claim 19 in which said organic solvent is present in an amount of at least about 25%, based on the total weight of reactive material and solvent.

21. An electron beam-curable coating composition as recited in claim 20 in which pigment is present in a pigment to binder weight ratio of at least 0.5:1.

22. An electron beam-curable coating composition as recited in claim 21 in which said pigment is present in a pigment to binder weight ratio in excess of 1:1, and said solvent is present in an amount to reduce the total solids content of the pigmented coating to the range of from 25% to 60%.

23. An electron beam-curable coating composition as recited in claim 22 in which said pigment is constituted by magnetic oxide particles in a pigment to binder weight ratio of at least 2:1.

24. An electron beam-curable coating composition, comprising the reaction product of claim 1 in combination with an acrylate-terminated polyurethane, said combination having a $T_g$ above room temperature after removal of organic solvent and prior to electron beam cure.

25. An electron beam-curable coating composition as recited in claim 24 in which said acrylate-terminated polyurethane is combined with the reaction product of claim 1 in a weight ratio based on solids of 80:20 to 40:60.

26. An electron beam-curable coating composition as recited in claim 24 in which said acrylate-terminated polyurethane is combined with the reaction product of claim 1 in a weight ratio based on solids of 75:25 to 50:50.

* * * * *